United States Patent
Terada

(10) Patent No.: US 7,626,617 B2
(45) Date of Patent: Dec. 1, 2009

(54) IMAGE EDITING APPARATUS, IMAGE EDITING PROGRAM, AND IMAGE EDITING METHOD

(75) Inventor: Masahiro Terada, Asaka (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 998 days.

(21) Appl. No.: 10/669,801

(22) Filed: Sep. 25, 2003

(65) Prior Publication Data

US 2004/0061791 A1 Apr. 1, 2004

(30) Foreign Application Priority Data

Sep. 27, 2002 (JP) ............... 2002-283268

(51) Int. Cl.
  *H04N 5/262* (2006.01)
  *G11B 27/00* (2006.01)
  *H04N 5/93* (2006.01)
(52) U.S. Cl. ............... 348/239; 386/4; 386/55
(58) Field of Classification Search ........... 348/239; 386/4, 55
See application file for complete search history.

(56) References Cited

U.S. PATENT DOCUMENTS

| | | | | |
|---|---|---|---|---|
| 3,035,093 | A * | 5/1962 | Beaver et al. ................ | 564/53 |
| 4,987,552 | A * | 1/1991 | Nakamura .................... | 386/64 |
| 5,101,364 | A * | 3/1992 | Davenport et al. ........... | 715/723 |
| 5,434,678 | A * | 7/1995 | Abecassis ..................... | 386/52 |
| 5,664,243 | A * | 9/1997 | Okada et al. ................. | 396/246 |
| 6,571,051 | B2 * | 5/2003 | Savoie ........................... | 386/55 |
| 7,055,100 | B2 * | 5/2006 | Moriwake et al. ........... | 715/723 |
| 7,075,683 | B1 * | 7/2006 | Shiiyama ...................... | 358/452 |
| 7,302,113 | B2 * | 11/2007 | Pilu et al. ..................... | 382/276 |
| 7,391,436 | B2 * | 6/2008 | Tojo ......................... | 348/207.99 |
| 2001/0016108 | A1 * | 8/2001 | Itoh et al. ...................... | 386/46 |
| 2002/0118285 | A1 * | 8/2002 | Misawa et al. ............ | 348/208.16 |
| 2004/0027369 | A1 * | 2/2004 | Kellock et al. ............... | 345/716 |

FOREIGN PATENT DOCUMENTS

| | | |
|---|---|---|
| JP | 06-062310 | 3/1994 |
| JP | 10-215434 | 8/1998 |
| JP | 2000-235637 | 8/2000 |

* cited by examiner

*Primary Examiner*—Sinh Tran
*Assistant Examiner*—Wanda M Negron
(74) *Attorney, Agent, or Firm*—McGinn IP Law Group, PLLC

(57) ABSTRACT

An image editing apparatus, an image editing program, and an image editing method can automatically set a video effect at the joint between moving picture data, and includes: a recording device which records a plurality of images and image related information; a video effect recording device which records image related information associated with a video effect during image switching; a comparison device which reads related information about two images stored in the recording device and compares the related information between the images; a video effect selection device which reads a corresponding video effect from a video effect recording device when there is matching related information between the compared related information; an image joining device which reads two images stored in the recording device, applies the video effect to them, and joins the images; and an output device which outputs the joined images to a display device.

22 Claims, 6 Drawing Sheets

FIG.4

RELATIONSHIP BETWEEN SAME IMAGE RELATED INFORMATION AND VIDEO EFFECT

| SAME IMAGE RELATED INFORMATION | VIDEO EFFECT |
|---|---|
| CAPTURING DATE | 1-SECOND BOX WINDOW WIPE |
| NAME OF CAMERA | 1-SECOND DOOR WIPE |
| ZOOM INFORMATION | SEMITRANSPARENT COMPOSITION OF 1-SECOND CROSSFADE |
| USER NAME A | 1-SECOND EMBOSSMENT EFFECT |
| USER NAME B | 1-SECOND SPHERICAL EFFECT |
| USER NAME C | 2-SECOND DOT FADE |
| ⋮ | |

FIG.5

RELATIONSHIP BETWEEN SIMILAR IMAGE RELATED INFORMATION AND VIDEO EFFECT

| SIMILAR IMAGE RELATED INFORMATION | VIDEO EFFECT |
|---|---|
| WITHIN 1 HOUR OF SHOOTING TIME DIFFERENCE | SEMITRANSPARENT COMPOSITION OF 1-SECOND CROSSFADE |
| DIFFERENT SHOOTING DATE | SEMITRANSPARENT COMPOSITION OF 2-SECOND CROSSFADE |
| DIFFERENT ZOOM INFORMATION | 1-SECOND ZOOM-IN |
| DIFFERENT USER NAMES | 2-SECOND MOSAIC EFFECT |
| SHOOTING PLACE FATHER THAN 500 M | 1-SECOND RIGHTWARD WIPE |
| ⋮ | |

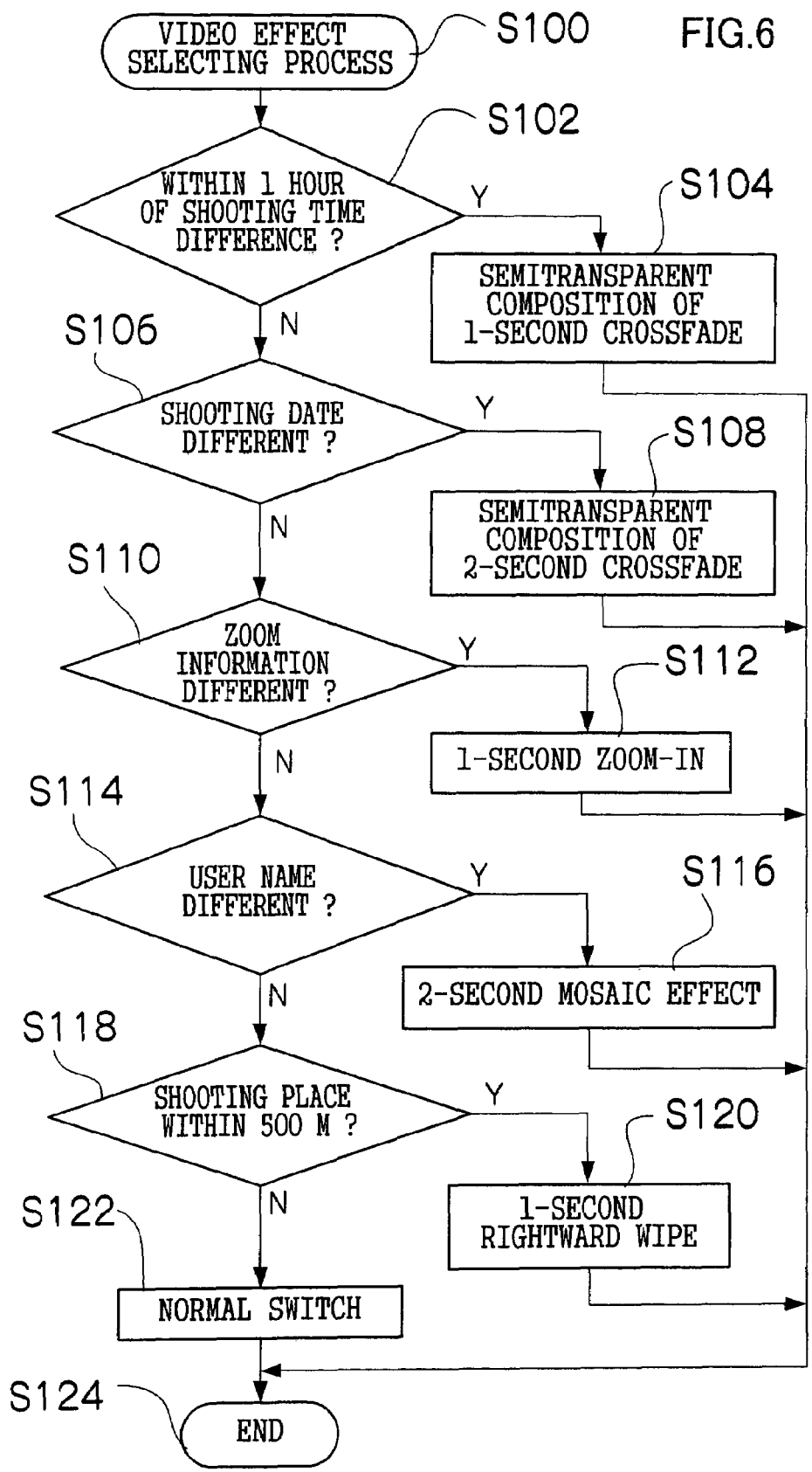

CROSSFADING TIME

CROSSFADING TIME

FADE-OUT  FADE-IN

IMAGE EDITING APPARATUS, IMAGE EDITING PROGRAM, AND IMAGE EDITING METHOD

BACKGROUND OF THE INVENTION

1. Field of the Invention

The present invention relates to an image editing apparatus, an image editing program, and an image editing method, and more specifically to an image editing apparatus, an image editing program, and an image editing method of joining images by applying a video effect during image switching to a portion in which a plurality of images are joined in time.

2. Description of the Related Art

Recently, a digital camera having the function of recording moving pictures has been introduced commercially, and digital data of moving pictures can be easily generated. Additionally, the function of editing moving pictures realizes the generation of new moving picture data by joining only necessary portions of plural pieces of generated moving picture data with unnecessary portions deleted by various types of commercially distributed application software. Therefore, an editing process can be easily performed on an image represented by digital data regardless of input sources.

Since, at a joint between scenes, the trailing portion of the previous scene does not continue along a time axis to the leading portion of the following scene, a sudden switch appears when a moving picture file of a scene is simply joined with a moving picture file of another scene. Therefore, a video effect such as smooth scene transitions, etc. is frequently used as an editing function.

A video effect such as smooth scene transitions, etc. is to joint scenes with smooth transitions at a switch of scenes by, for example, crossfading, that is, overlapping for several seconds the previous and following scenes such that the previous scene can fade out while the following scene are fading in. Furthermore, there is an effect of producing images more effectively than a simple joining of images in time. Thus, there are various video effects using more than tens of basic transition patterns.

Conventionally, when the above-mentioned transitions are used, an editor has to set what type of transition is to be applied to each joint between scenes when an image editing process is performed. Therefore, although it is possible to have a representation effect of transitions, an editor has to perform laborious operations in the editing process.

Additionally, a conventional image processing system is configured by an automatic recording system unit for outputting a moving picture file obtained by detecting a subject, capturing the detected subject, and then coding the captured subject while generating the information for associating the subject with the moving picture file, and an automatic editing system unit for extracting moving picture files depending on management information, joining a plurality of extracted moving picture files, and generating a joined moving-picture file. In this image processing system, new moving picture data can be autonomously generated with consistency on a specific subject recorded by plural pieces of moving picture data (for example, refer to Japanese Patent Application Publication No. 10-215434).

Japanese Patent Application Publication No. 10-215434 discloses that new moving picture data is autonomously generated with consistency on a specific subject recorded by plural pieces of moving picture data, and plural pieces of moving picture data are joined. This aims at automatically selecting image data to be joined, and does not describe any improvement for joining images. Therefore, when moving pictures are edited, the editor has to set which type of transition is to be used on each joint between scenes, thereby requiring laborious operations in the editing process.

Further more, a conventional image processing system can include a computation device for computing the similarity between a plurality of image frames of moving picture data, a determination device for determining a change point between scenes based on the similarity computed by the computation device, and a moving picture device for automatically editing and generating digested moving pictures of moving picture data by merging frames for a specified time period in the scenes segmented at a change point between scenes. According to the image processing system, desired contents of moving pictures can be precisely confirmed within a short time (for example, refer to Japanese Patent Application Publication No. 2000-235637).

Patent Application Publication No. 2000-235637 discloses automatic editing and automatically generating high-quality digested moving pictures. However, the digested moving pictures can be stored, although data area sizes of a header, an FAT, etc. of moving picture data is restricted. Therefore, an editor has to determine the use of transitions on a joint between moving pictures.

SUMMARY OF THE INVENTION

The present invention has been developed to solve the above-mentioned problems, and aims at providing an image editing apparatus, an image editing program, and an image editing method capable of allowing a user only to select images to be joined and at automatically setting the video effect (transition process, etc.) on a joint between moving picture data.

To attain the above-mentioned subject, an image editing apparatus which joints a plurality of images in time of the present invention includes: a recording device which records a plurality of images associated with image related information including at least one of a shooting date and time, a shooting condition, a shooting place, and a user name; a video effect recording device which records a range of image related information associated with a video effect during image switching; a comparison device which reads first image related information about a first image recorded in the recording device and second image related information about a second image recorded in the recording device, and compares the image related information about the first and second images; a video effect selection device which reads from the video effect recording device a video effect during image switching according to image related information similar to a predetermined range when there is the image related information similar in the predetermined range between the image related information about the first and second images as a result of the comparison; an image joining device which reads the first and second images recorded in the recording device, and joins the images by applying the video effect during image switching read by the video effect selection device to a portion in which the images are to be joined in time; and an output device which outputs the joined images. The output device can be a device which outputs joined images to a display device, outputs joined images to a recording medium, and outputs them to another communications equipment.

According to the present invention, the image editing apparatus reads the first image related information about a first image and the second image related information about a second image stored in a recording device, and compares the image related information between the images, reads from the video effect recording device a video effect during image switching according to image related information similar in a predetermined range between the image related information about the first and second images as a result of the comparison, and outputs to a display device, a recording medium, or another communications equipment an image generated by applying a video effect at a switch point between the first and second images read from the recording device using the video effect. Therefore, the user only has to select images to be joined, and a video effect can be automatically set on a joint between moving picture data.

As described above, according to the image editing apparatus, the image editing program, and the image editing method of the present invention, the first image related information about the first image and the second image related information about the second image stored in the recording device are read and compared with each other. When there is similar image related information in a predetermined range between them as a result of the comparison, the video effect during image switching according to the similar image related information in the predetermined range is read from the video effect recording device, the video effect is applied to the switch portion between the first image and the second image read from the recording device using the video effect, and the image obtained by joining the images is output to the display device, the recording medium, or another communications equipment. Therefore, the user only has to select the images to be joined, and the video effect at the joint between moving picture data can be automatically set.

Furthermore, according to the present invention, it is necessary only to select two types of still images or moving pictures to automatically generate an image file of animation GIF, etc. with transition effects. Therefore, for example, transitions can be automatically assigned to the images read from the electronic camera 10 to easily generate a high-impact original album.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 shows the same image related information recorded as associated by a video effect recording device, and a video effect during image switching;

FIG. 5 shows the similar image related information recorded as associated by a video effect recording device, and a video effect during image switching;

FIG. 6 is a flowchart of the video effect selecting process performed by the image editing apparatus;

DETAILED DESCRIPTION OF THE PREFERRED EMBODIMENTS

The image editing apparatus, the image editing program, and the image editing method are described below in detail by referring to the attached drawings.

Figure 1:
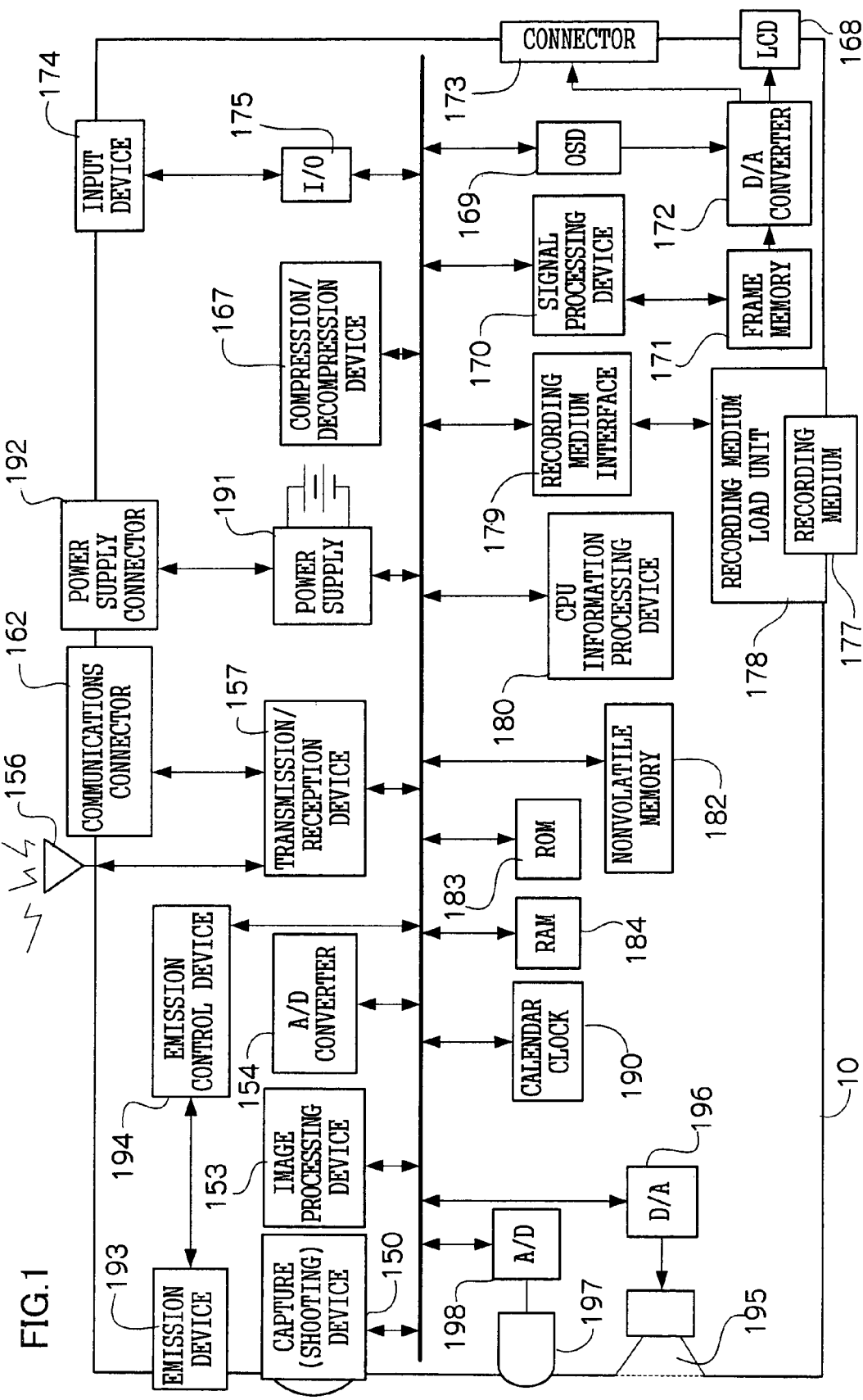
FIG. 1 is a block diagram of a signal processing system of the image editing apparatus according to the present invention.

FIG. 1 is a block diagram of a signal processing system of the image editing apparatus according to the present invention.

An image processing unit of an electronic camera 10 which is an embodiment of the image editing apparatus having a computer device is provided with a capture device (shooting device) 150 which forms an image of a subject on a photoreceiving surface using a zoom lens and performs an optoelectronic transform, and outputs the result as an image signal, an image processing device 153 which performs on an analog image signal a process such as an image size changing process, a sharpness amendment, an outline processing, a contrast amendment, etc., and an A/D converter 154 which converts an analog image signal into digital image data.

Furthermore, the communications device of the electronic camera 10 for communicating an image file, etc. with another communications equipment through communications is provided with a transmission/reception device 157 (which can include the function of an output device which outputs an image to another communications equipment) which transmits or receives information such as an image file, etc. through a carrier wave, an antenna 156 which communicates a carrier wave, an image file, etc., and a communications connector 162 which communicates information such as an image file, etc. with another communications equipment through a communications cable.

The electronic camera 10 is also provided with a compression/decompression device 167 which performs a compressing process or a thinning process on information such as image data, etc. in a method represented by the JPEG, the motion JPEG, etc., and a decompressing process on the compressed image data, etc., an OSD 169 which displays on the screen of a display device 168 the data, etc. of various characters and messages together with images, a signal processing device 170 (which can include the function of a image joining device) which performs white-balance processing, gamma conversion, a YC converting process, a pixel number converting process, a electronic zoom process, a trimming process, a color tone converting process, etc. on the digital image data obtained by capture an image, frame memory 171 which temporarily stores image data for display, a D/A converter 172 (which can include the function of an output device for outputting an image to a display device) which converts digital image data into a composite signal, etc. for display, and a connector 173 which outputs a signal for display to display equipment of each unit.

The electronic camera 10 is also provided with an input device 174 which comprises a power supply switch, a release button, a communications button, a transmission button, a function switch, a cross button, a confirmation switch, a mode switch, etc., an I/O 175 which is an interface for inputting/outputting input information input through the input device 174 and information for a display device such as an LED, etc., a recording medium load unit 178 for loading a recording medium 177 (which can include the function of the recording device and the video effect recording device) as attachable and detachable, and a recording medium interface 179 (which can include the function of an output device for outputting an image to a recording medium) which records and reads information such as image data, etc. in and from the recording medium 177. The recording medium 177 is a semiconductor such as a memory card, etc. and a magnetic recording medium, an optical recording medium, etc. which can be attachable and detachable such as an MO, a hard disk, etc.

Furthermore, the electronic camera 10 is also provided with an information processing device 180 (which can include the functions of a comparison device, a video effect selection device, and an image joining device) which controls the entire electronic camera 10, controls the sampling timing of image data, controls the recording of image data, recognizes the graphics of image data, reads the model information about the electronic camera 10 or identification information specific to equipment, controls the communications, controls the recording of images and voice, and controls display control etc., nonvolatile memory 182 (which can include the functions of a comparison device and a video effect recording device) which is a recording device capable of rewriting information and continuously storing information about various stored constants, etc. for amendments even after power-off, ROM 183 which is a storage device storing specific information such as the model name, the production number, etc. of the electronic camera 10, an operation program, each constant, information about display, etc., and RAM 184 which is a storage device for a quick read and write as a work area during execution of a program.

The electronic camera 10 is also provided with a calendar clock 190 which keeps time, a power supply 191 which supplies electric power for driving the electronic camera 10, a power supply connector 192 which receives a supply of electric power from an external power supply, an emission device 193 which supplements the deficiency of light quantity by emitting light to a subject during capturing, and an emission control device 194 which adjusts the emission timing of the emission device 193 and the quantity of emitted light.

Furthermore, the electronic camera 10 is also provided with a speaker 195 which notifies a user of a voice or a beep alarm, a D/A converter 196 which converts digital voice information obtained from the information processing device 180, etc. into an analog voice signal, and transmits a conversion result to the speaker 195, a microphone 197 which collects voice around, and an A/D converter 198 which converts analog voice information collected by the microphone 197 into digital voice data.

As shown in FIG. 1, the information processing device 180 of the electronic camera 10 and each peripheral circuit are connected through a bus, can quickly communicate information, and can control each peripheral circuit according to the process program executed by the information processing device 180. Additionally, the information processing device 180 and its peripheral circuit can also be configured by an LSI such as an ASIC, etc.

Described below is the capturing process of the electronic camera 10 as described above by referring to the configuration.

A captured image is formed on the photoreceiving surface of the capture device 150 by a zoom lens, a formed subject image is processed in an optoelectronic transform, and the result is output to the image processing device 153. The image processing device 153 performs an image processing such as correlation double sampling, amplification, noise reduction, etc. on the image signal, and the A/D converter 154 converts the process result into digital data.

The image data converted into the digital data is transferred to the signal processing device 170 at a command of the information processing device 180, processed in the image processing such as white-balance processing, gamma correction, a YC converting process, a zoom process, a pixel number converting process, etc., and then temporarily stored in the frame memory 171 such as VRAM, etc.

The information processing device 180 issues an instruction to transmit image data stored in the frame memory 171 to the D/A converter 172, and displays the data with the information such as a character, etc. generated by the OSD 169 on the monitor of the display device 168.

When a user presses a release button provided for the input device 174 to issue a capture instruction, the information processing device 180 enters a mode of capturing a subject. Then, the information processing device 180 records still image or moving picture data converted into digital data by the A/D converter 154 in the RAM 184.

When an image is recorded in the recording medium 177, the image stored in the RAM 184 is sequentially read, transferred to the signal processing device 170, treated in the image processing such as white-balance processing, gamma correction, a YC converting process, a zoom process, a pixel number converting process, etc., and then in a gray-scale conversion in each color, an image size converting process, etc., and then transferred to the compression/decompression device 167.

The image data treated in the compressing process under a predetermined condition by the compression/decompression device 167 is temporarily stored in a work area for a file in the temporary RAM 184 at an instruction of the information processing device 180, converted into image data for recording and output to the recording medium interface 179, and then sequentially recorded in the recording medium 177. When the recording capacity of the nonvolatile memory 182 is large, the image data can be recorded in the nonvolatile memory 182.

Described below is the recording process of the electronic camera 10.

The voice around is collected by the microphone 197, and converted into a voice signal. The obtained voice signal is amplified by a first-stage amplifier, and then output to the A/D converter 198. The voice data converted into digital data by the A/D converter 198 is temporarily stored in the RAM 184, treated by the compression/decompression device 167 in the compressing process or the thinning process as necessary, converted into voice data for recording through a work area for a file in the RAM 184, transferred to the recording medium interface 179, and then recorded in the recording device such as the recording medium 177, etc.

In the explanation above, the image editing apparatus is embodies as an electronic camera comprising a capturing device. However, the present invention is not limited to this application, but the purpose of the present invention can be attained by a personal computer, a mobile telephone, a PDA, etc. so far as an editing device capable of obtaining an image from an external equipment or a recording device, and joining still images or moving pictures in time can be included.

Figure 2:
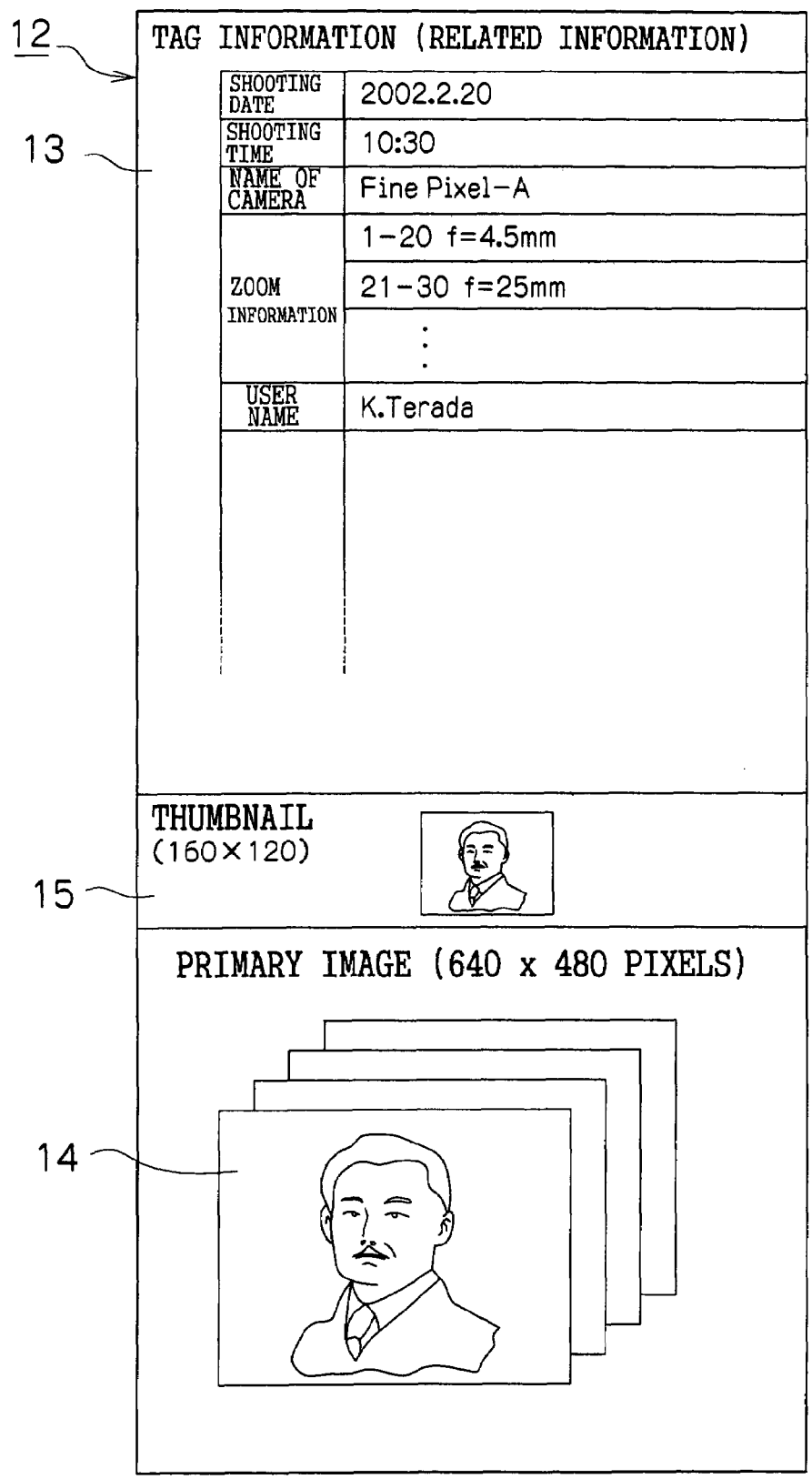
FIG. 2 shows the structure of a first image file recorded in a recording device.

FIG. 2 shows the structure of the first image file recorded in the recording device.

As shown in FIG. 2, an image file 12 is formed by a portion storing a primary image 14 (which can be a still image) of a moving picture in an image recording format such as the Motion-JPEG or the MPEG, etc., a portion storing a thumbnail image 15 (representative image) for listing of the primary image 14, and a portion storing related information 13 (image related information) about the primary image 14.

The portion storing the related information 13 contains an area storing a capturing date on which the primary image 14 is captured, an area storing a capturing time, an area storing the name of a camera used in the capturing, an area storing the frame of a captured image and the information about a zoom position when the image is captured, and a user name record area storing the information relating to a person who captures the images and the owner of the electronic camera 10.

Figure 3:
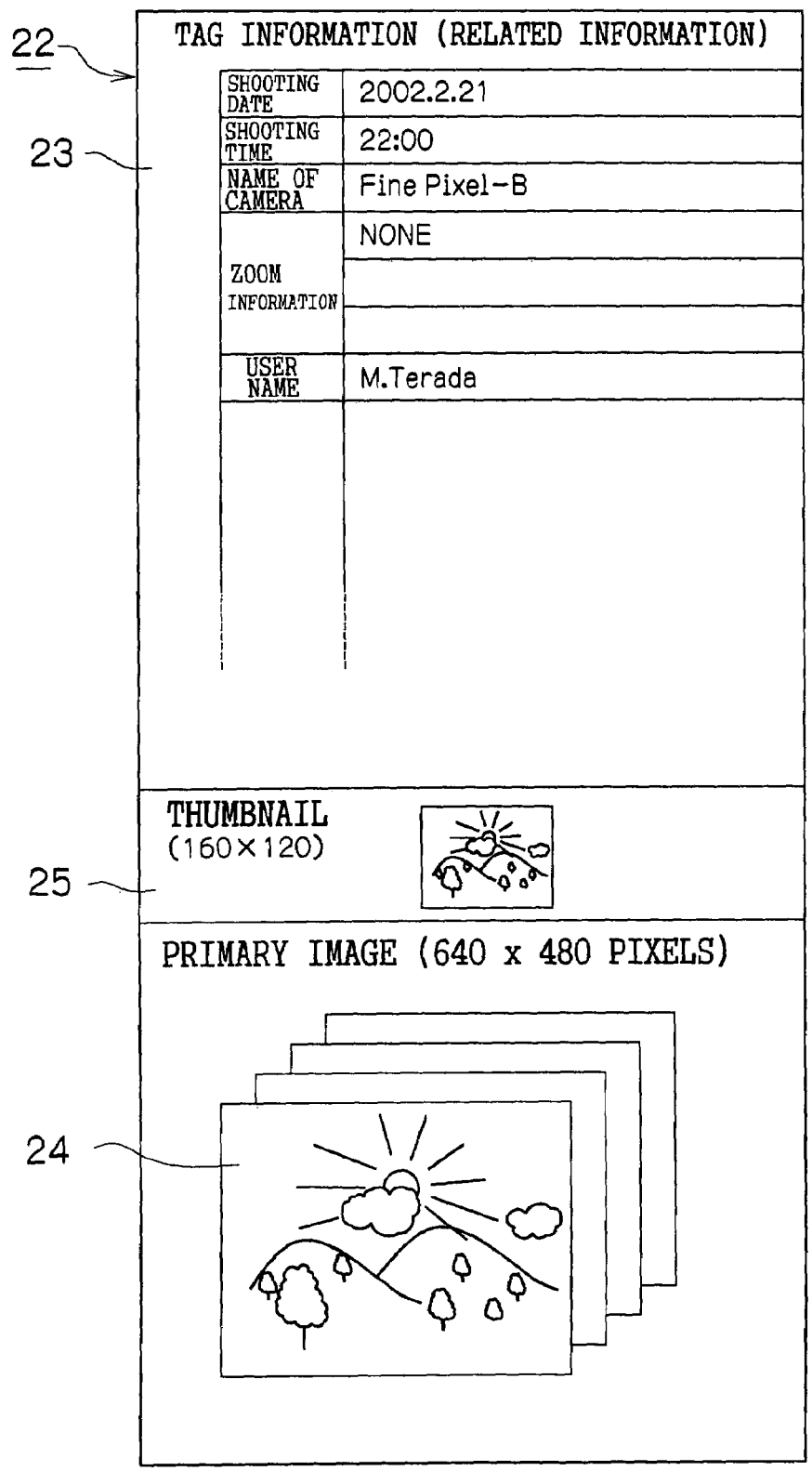
FIG. 3 shows the structure of a second image file recorded in a recording device.

FIG. 3 shows the structure of the second image file recorded in the recording device.

As shown in FIG. 3, an image file 22 is formed by a portion storing a primary image 24 (which can be a still image) of a moving picture in an image recording format such as the Motion-JPEG or the MPEG, etc., a portion storing a thumbnail image 25 (representative image) for listing of the primary image 24, and a portion storing related information 23 (image related information) about the primary image 24.

The portion storing the related information 23 contains an area storing a capturing date on which the primary image 24 is captured, an area storing a capturing time, an area storing the name of a camera used in the capturing, and a user name record area storing the information relating to a person who captures the images and the owner of the electronic camera 10.

The recording device such as the recording medium 177, the nonvolatile memory 182, etc. can store a plurality of images associated with the image related information such as the capturing date and time, the capturing condition, the capturing place, the user name, etc.

Furthermore, the video effect recording device such as the recording medium 177, the nonvolatile memory 182, etc. can store the image related information associated with the video effect during image switching, or the range of image related information associated with the video effect during image switching.

The information processing device 180 (comparison device) reads the first image related information about the first image and the second image related information about the second image, and compares the image related information between the images.

When there is matching image related information between the image related information of the first and second images as a result of the comparison, the information processing device 180 (video effect selection device) can read the video effect during image switching according to the matching image related information from the recording medium 177, the nonvolatile memory 182, etc.

When there is similar image related information in a predetermined range between the image related information of the first and second images as a result of the comparison, the information processing device 180 (video effect selection device) can read the video effect during image switching according to the similar image related information in the predetermined range from the recording medium 177, the nonvolatile memory 182, etc.

When there is not matching image related information between the image related information of the first and second images as a result of the comparison, the information processing device 180 (video effect selection device) can read the video effect during image switching according to the no matching image related information from the recording medium 177, the nonvolatile memory 182, etc.

The image joining device such as the information processing device 180, the signal processing device 170, etc. can read the first image and the second image stored in the recording device such as the recording medium 177, the nonvolatile memory 182, etc., and perform the process of joining the images by applying the video effect during image switching read by the video effect selection device to a joint portion in time between the images.

The output device such as the D/A converter 172, etc. can output the joined image to the display device 168.

The output device such as the recording medium interface 179, etc. can output the joined images to the recording medium 177, etc.

The output device such as the transmission/reception device 157, etc. can output the joined images to another communications equipment.

FIG. 4 shows the same image related information associated with the video effect during image switching and stored in the video effect recording device.

When a plurality of images are joined, a user operates the input device 174 of the electronic camera 10, and puts the process mode of the electronic camera 10 in the image editing mode. Then, the user inputs the information that a list of images stored in the recording device such as the recording medium 177, etc. through the input device 174 to select the images to be edited. Then, the display device 168 lists the thumbnail images of a plurality of images stored in the recording device such as the recording medium 177, etc.

The user inputs the information that the first image and the second image to be edited are selected from among the plurality of listed images through the input device 174. Then, the information processing device 180 (comparison device, video effect selection device) reads the first image related information about the first image and the second image related information about the second image stored in the recording device such as the recording medium 177, etc., and compares the image related information between the images. When there is matching image related information between the image related information of the images, the video effect during image switching according to the matching image related information is read from the chart shown in FIG. 4.

Then, the image joining device such as the information processing device 180, the signal processing device 170, etc. reads the first and second images stored in the recording device such as the recording medium 177, the nonvolatile memory 182, etc., and performs the process of joining the images by applying the video effect during image switching read from the chart shown in FIG. 4 to a joint portion in time between the images.

The information processing device 180 outputs the joined images to the display device 168 through the signal processing device 170, the frame memory 171, and the D/A converter 172 (output device) at an instruction of the user.

When the joined images are recorded in the recording device such as the recording medium 177, etc., the information processing device 180 converts the joined images into an image file for recording, and outputs an instruction to record the file in the recording medium 177 through the recording medium interface 179 and the recording medium implementation unit 178 (output device).

When the joined images are output to another communications equipment, the information processing device 180 converts the joined images into an image file for transmission, and outputs the file to another communications equipment through the transmission/reception device 157 (output device) and the antenna 156.

According to the present invention, it is possible to automatically set the crossfading time and the video effect when a plurality of images are joined as described above, and it is not necessary for a user to perform complicated setting operations for the video effect during image switching.

FIG. 5 is a chart showing the similar image related information associated with the video effect during image switching and stored in the video effect recording device. The similar image related information shows the condition of similarity in a predetermined range between the first image related information and the second image related information.

When a user inputs the information that the first image and the second image to be edited are selected through the input device 174, the information processing device 180 (comparison device, video effect selection device) reads the first image related information about the first image and the second image related information about the second image stored in the recording device such as the recording medium 177, etc. and compares the image related information between the images. When there is similar image related information in a predetermined range between the image related information of the images, the video effect during image switching according to the similar image related information in the predetermined range is read from the chart shown in FIG. 5.

The image joining device such as the information processing device 180, the signal processing device 170, etc. reads the first image and the second image stored in the recording device such as the recording medium 177, the nonvolatile memory 182, etc., and performs the process of joining the images by applying the video effect during image switching read from the chart shown in FIG. 5 to a joint portion in time between the images.

According to the present invention, it is possible to automatically set the crossfading time and the video effect when a plurality of images are joined as described above, and it is not necessary for a user to perform complicated setting operations for the video effect during image switching.

FIG. 6 is a flowchart of the video effect selecting process performed by the image editing apparatus.

When a user puts the process mode of the electronic camera 10 in the image editing mode to join a plurality of images and inputs the information that the first image and the second image to be edited are selected from among a plurality of images listed on the display device 168 through the input device 174, the information processing device 180 (comparison device, video effect selection device) reads the first image related information about the first image and the second image related information about the second image stored in the recording device such as the recording medium 177, etc. Then, control is passed to the "video effect selecting process" in S100 to compare the image related information between the images, and then to the comparing process of "within 1 hour of capturing time difference?" in S102.

In S102, the information processing device 180 compares the capturing time contained in the first image related information about the first image read from the recording device such as the recording medium 177, etc. with the capturing time contained in the second image related information about the second image. If it is determined as a result of the comparison that the capturing time difference between them is within 1 hour, then the video effect processing of "semitransparent composition of 1-second crossfade" recorded as associated with "within 1 hour of capturing time difference?" in the similar image related information shown in FIG. 5 is read, and the process performed by the information processing device 180 is branched to the process of "semitransparent composition of 1-second crossfade" in S104.

In S104, the information processing device 180 reads the first image and the second image stored in the recording device such as the recording medium 177, the nonvolatile memory 182, etc., and performs the process of joining the images by applying the read video effect of "semitransparent composition of 1-second crossfade" to a joint portion in time between the images. If the process of joining the images is completed in S104, the information processing device 180 then performs the process "end" in S124, thereby terminating the video effect selecting process.

If it is determined as a result of the comparison in S102 that the capturing time difference between them is not within 1 hour, then the information processing device 180 performs the comparing process of "capturing date different?" in S106.

Similarly, the comparing process is performed in the priority order of S106, S110, S114, and S118, thereby automatically setting the video effect according to the image related information. If there is no image related information corresponding to any of the first image related information about the first image and the second image related information about the second image, then the information processing device 180 performs the process "normal switch" in S122, performs the process of directly joining the first image with the second image without the crossfading time, and terminates the video effect selecting process in S124.

Figure 7:
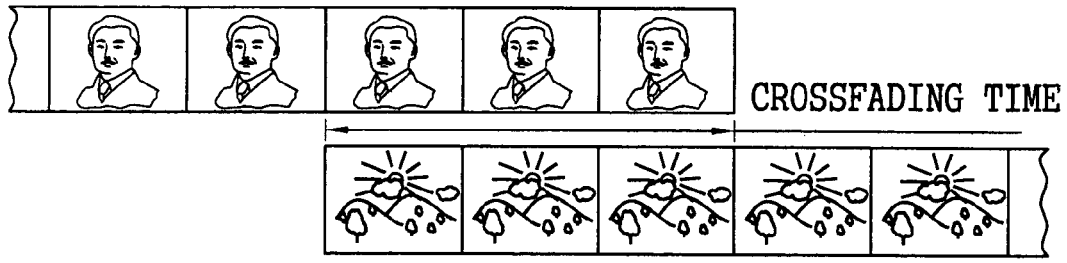
FIG. 7 is an explanatory view of a crossfading time when the first and second images are joined.

FIG. 7 shows the crossfading time in the process of joining the first image with the second image.

As shown in FIG. 7, the first image is a portrait image to be joined with the second image (landscape image) using a predetermined video effect within a predetermined crossfading time.

Figure 8:
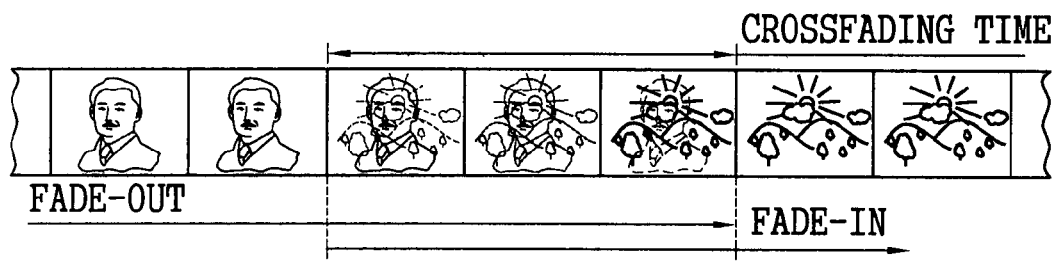
FIG. 8 shows an image obtained by joining images using a video effect of a semitransparent composition.

FIG. 8 shows an image obtained by joining the first image with the second image using the semitransparent composition.

As shown in FIG. 8, if the video effect of the semitransparent composition is used when the first image is joined with the second image, the semitransparent fade-out process is performed while crossfading the first image (portrait). Then, the second image (landscape image) is joined while performing the semitransparent fade-in process during the crossfading.

Figure 9:
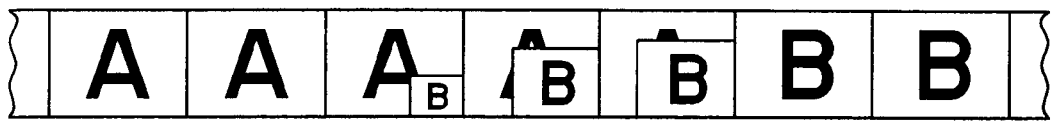
FIG. 9 shows an image obtained as a result of joining images using the video effect of a corner wipe.

FIG. 9 shows the image obtained by joining the first image with the second image using the video effect of corner wipe.

When the first image of a character "A" is joined with the second image of a character "B" using the video effect of corner wipe, the second image is gradually enlarged and overlays from the lower right corner toward the upper left corner within the crossfading time as shown in FIG. 9, thereby switching from the first image to the second image.

Figure 10:
FIG. 10 shows an image obtained as a result of joining images using the video effect of an upper wipe.

FIG. 10 shows the image obtained by joining the first image with the second image using the video effect of upward wipe.

When the first image of a character "A" is joined with the second image of a character "B" using the video effect of upward wipe, the first and second images are scrolled upwards within the crossfading time as shown in FIG. 10, thereby switching from the first image to the second image.

The wipe patterns of the video effect during image switching can be various video effects such as semitransparent wipe, 2-image wipe, 3-image wipe, left wipe, right wipe, upward wipe, downward wipe, mosaic wipe, box window wipe, circle window wipe, corner wipe, door wipe, shutter wipe, blind wipe, division wipe, bound, scroll, etc.

The effect pattern and the overlap pattern in another video effect during image switching can be various video effects such as semitransparent composition, mosaic effect, embossment effect by turning color tone, spherical surface effect, waveform effect, transform effect, white fade, black fade, crossfade, dot fade, etc.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image editing apparatus which joins a plurality of images in time, comprising:
   a recording device which records a plurality of images associated with image related information including at least one of a shooting date and time, a shooting condition, a shooting place, and a user name;
   a video effect recording device which records image related information associated with a video effect during image switching;
   a comparison device which reads first image related information about a first image recorded in the recording device and second image related information about a second image recorded in the recording device, and compares the image related information about the first and second images;
   a video effect selection device which reads from the video effect recording device a video effect according to matching image related information between the image related information about the first and second images as a result of the comparison;
   an image joining device which reads the first and second images recorded in the recording device, and automatically joins the images by applying the video effect read by the video effect selection device to a portion in which the images are to be joined in time; and
   an output device which outputs the joined images,
   wherein said video effect selection device further reads from the video effect recording device:
      a video effect according to image related information similar in a predetermined range when there is image related information similar in a predetermined range between the image related information about the first and second images as a result of the comparison; and
      a video effect according to no matching image related information when there is no matching image related information between the image related information about the first and second images as a result of the comparison.

2. The image editing apparatus of claim 1, wherein said plurality of images recorded in said recording device comprises an image file including at least one of a primary image of a moving picture in an image recording format, a thumbnail image for listing the primary image, and image related information about the primary image.

3. The image editing apparatus of claim 2, wherein a portion of said image file which stores said image related information comprises at least one of a capturing date on which the primary image was captured, a capturing time, a name of said image editing apparatus, a frame of said captured image, information about a zoom position when said image was captured, and information relating to a user of said image editing apparatus.

4. The image editing apparatus of claim 2, wherein said image recording format comprises one of Motion-JPEG format and MPEG format.

5. The image editing apparatus of claim 1, further comprising:
   an input device comprising a mode switch for putting said image editing apparatus in an image editing mode.

6. The image editing apparatus of claim 1, further comprising:
   an input device for selecting images to be edited from among said plurality of images.

7. The image editing apparatus of claim 6, further comprising:
   a display device for displaying a list of images,
   wherein a user using said input device selects plural images from said displayed list of images to be edited.

8. The image editing apparatus of claim 1, wherein said video effect recording device comprises a table including a list of said image related information and a video effect associated with said image related information.

9. The image editing apparatus of claim 1, wherein said image joining device joins said images by automatically applying said video effect during image switching.

10. The image editing apparatus of claim 1, wherein said image editing apparatus comprises one of an electronic camera, a personal computer, a mobile telephone, and a personal digital assistant (PDA).

11. An image editing apparatus which joins a plurality of images in time, comprising:
    a recording medium loading unit which loads a recording device for recording a plurality of images associated with image related information including at least one of a shooting date and time, a shooting condition, a shooting place, and a user name;
    a video effect recording device which records a range of image related information associated with a video effect during image switching;
    a comparison device which reads first image related information about a first image recorded in the recording device and second image related information about a second image recorded in the recording device, and compares the image related information about the first and second images;
    a video effect selection device which reads from the video effect recording device a video effect according to image related information similar in a predetermined range between the image related information about the first and second images as a result of the comparison;
    an image joining device which reads the first and second images recorded in the recording device, and automatically joins the images by applying the video effect read by the video effect selection device to a portion in which the images are to be joined in time; and
    an output device which outputs the joined images,
    wherein said video effect selection device further reads from the video effect recording device:
       a video effect according to image related information similar in a predetermined range when there is image related information similar in a predetermined range between the image related information about the first and second images as a result of the comparison; and
       a video effect according to no matching image related information when there is no matching image related information between the image related information about the first and second images as a result of the comparison.

12. An image editing apparatus which joins a plurality of images in time, comprising:
    a recording device which records a plurality of images associated with image related information including at least one of a shooting date and time, a shooting condition, a shooting place, and a user name;
    a video effect recording device which records a range of image related information associated with a video effect during image switching;
    a comparison device which reads first image related information about a first image recorded in the recording device and second image related information about a second image recorded in the recording device, and compares the image related information about the first and second images;

a video effect selection device which reads from the video effect recording device a video effect according to image related information similar in a predetermined range between the image related information about the first and second images as a result of the comparison;

an image joining device which reads the first and second images recorded in the recording device, and automatically joins the images by applying the video effect read by the video effect selection device to a portion in which the images are to be joined in time; and an output device which outputs the joined images, wherein said video effect selection device further reads from the video effect recording device:

a video effect according to image related information similar in a predetermined range when there is image related information similar in a predetermined range between the image related information about the first and second images as a result of the comparison; and a video effect according to no matching image related information when there is no matching image related information between the image related information about the first and second images as a result of the comparison.

13. A programmable storage medium tangibly embodying a program of machine-readable instructions executable by a digital processing apparatus to perform an image editing method, said method comprising:

in an image editing apparatus having a recording device which records a plurality of images associated with image related information including at least one of a shooting date and time, a shooting condition, a shooting place, and a user name, a video effect recording device which records a range of image related information associated with a video effect during image switching, a comparison device which compares image related information about a first image with image related information about a second image, a video effect selection device which reads from the video effect recording device a video effect depending on a comparison result, an image joining device which joins a first image with a second image by applying the video effect to the first and second images, an output device which outputs the joined images, and an information processing device which controls the recording device, the video effect recording device, the comparison device, the video effect selection device, the image joining device, and the output device:

reading in the comparison device first image related information about a first image recorded in the recording device and second image related information about a second image recorded in the recording device, and comparing the image related information about the first and second images;

reading in the video effect selection device from the video effect recording device a video effect according to image related information similar in a predetermined range between the image related information about the first and second images as a result of the comparison;

reading the first and second images recorded in the recording device, and automatically joining in the image joining device the images by applying the video effect read by the video effect selection device to a portion in which the images are to be joined in time; and outputting in the output device the joined images, wherein said video effect selection device further reads from the video effect recording device:

a video effect according to image related information similar in a predetermined range when there is image related information similar in a predetermined range between the image related information about the first and second images as a result of the comparison; and a video effect according to no matching image related information when there is no matching image related information between the image related information about the first and second images as a result of the comparison.

14. An image editing method, comprising:

in an image editing apparatus having a recording device which records a plurality of images associated with image related information including at least one of a shooting date and time, a shooting condition, a shooting place, and a user name, a video effect recording device which records a range of image related information associated with a video effect during image switching, a comparison device which compares image related information about a first image with image related information about a second image, a video effect selection device which reads from the video effect recording device a video effect depending on a comparison result, an image joining device which joins a first image with a second image by applying the video effect to the first and second images, and an output device which outputs the joined images:

reading first image related information about a first image recorded in the recording device and second image related information about a second image recorded in the recording device, and comparing the image related information about the first and second images, in the comparison device;

reading in the video effect selection device from the video effect recording device a video effect according to image related information similar in a predetermined range between the image related information about the first and second images as a result of the comparison;

reading the first and second images recorded in the recording device, and automatically joining the images by applying the video effect read by the video effect selection device to a portion in which the images are to be joined in time, in the image joining device; and outputting in the output device the joined images, wherein said video effect selection device further reads from the video effect recording device:

a video effect according to image related information similar in a predetermined range when there is image related information similar in a predetermined range between the image related information about the first and second images as a result of the comparison; and a video effect according to no matching image related information when there is no matching image related information between the image related information about the first and second images as a result of the comparison.

15. An image editing apparatus which joins a plurality of images in time, comprising:

a recording device which records a plurality of images associated with image related information including at least one of a shooting date and time, a shooting condition, a shooting place, and a user name;

a video effect recording device which records image related information associated with a video effect during image switching;

a comparison device which reads first image related information about a first image recorded in the recording device and second image related information about a second image recorded in the recording device, and compares the image related information about the first and second images;

a video effect selection device which reads from the video effect recording device a video effect according to matching image related information between the image related information about the first and second images as a result of the comparison;

an image joining device which reads the first and second images recorded in the recording device, and automatically joins the images by applying the video effect read by the video effect selection device to a portion in which the images are to be joined in time; and an output device which outputs the joined images wherein said video effect recording device comprises a table including a list of said image related information and a video effect associated with said image related information.

16. The image editing apparatus of claim 15, wherein said image related information is included in said list in order of priority.

17. The image editing apparatus of claim 15, wherein said comparison device compares first image related information for said first and second images, wherein if said first image related information for said first image matches said first image information for said second image, said video effect selection device selects said video effect associated with said first image related information and terminates a video effect selection process, and wherein if said first image related information for said first image does not match said first image related information for said second image, said comparison device compares second image related information for said first and second images.

18. The image editing apparatus of claim 17, wherein said second image related information has a lower priority than said first image related information.

19. An image editing apparatus which joins a plurality of images in time, comprising:

a recording medium loading unit which loads a recording device for recording a plurality of images associated with image related information including at least one of a shooting date and time, a shooting condition, a shooting place, and a user name;

a video effect recording device which records a range of image related information associated with a video effect during image switching;

a comparison device which reads first image related information about a first image recorded in the recording device and second image related information about a second image recorded in the recording device, and compares the image related information about the first and second images;

a video effect selection device which reads from the video effect recording device a video effect according to image related information similar in a predetermined range between the image related information about the first and second images as a result of the comparison;

an image joining device which reads the first and second images recorded in the recording device, and automatically joins the images by applying the video effect read by the video effect selection device to a portion in which the images are to be joined in time; and an output device which outputs the joined images, wherein said video effect recording device comprises a table including a list of said image related information and a video effect associated with said image related information.

20. An image editing apparatus which joins a plurality of images in time, comprising:

a recording device which records a plurality of images associated with image related information including at least one of a shooting date and time, a shooting condition, a shooting place, and a user name;

a video effect recording device which records a range of image related information associated with a video effect during image switching;

a comparison device which reads first image related information about a first image recorded in the recording device and second image related information about a second image recorded in the recording device, and compares the image related information about the first and second images;

a video effect selection device which reads from the video effect recording device a video effect according to image related information similar in a predetermined range between the image related information about the first and second images as a result of the comparison;

an image joining device which reads the first and second images recorded in the recording device, and automatically joins the images by applying the video effect read by the video effect selection device to a portion in which the images are to be joined in time; and an output device which outputs the joined images, wherein said video effect recording device comprises a table including a list of said image related information and a video effect associated with said image related information.

21. A programmable storage medium tangibly embodying a program of machine-readable instructions executable by a digital processing apparatus to perform an image editing method, said method comprising:

in an image editing apparatus having a recording device which records a plurality of images associated with image related information including at least one of a shooting date and time, a shooting condition, a shooting place, and a user name, a video effect recording device which records a range of image related information associated with a video effect during image switching, a comparison device which compares image related information about a first image with image related information about a second image, a video effect selection device which reads from the video effect recording device a video effect depending on a comparison result, an image joining device which joins a first image with a second image by applying the video effect to the first and second images, an output device which outputs the joined images, and an information processing device which controls the recording device, the video effect recording device, the comparison device, the video effect selection device, the image joining device, and the output device:

reading in the comparison device first image related information about a first image recorded in the recording device and second image related information about a second image recorded in the recording device, and comparing the image related information about the first and second images;

reading in the video effect selection device from the video effect recording device a video effect according to image related information similar in a predetermined range between the image related information about the first and second images as a result of the comparison;

reading the first and second images recorded in the recording device, and automatically joining in the image joining device the images by applying the video effect read by the video effect selection device to a portion in which the images are to be joined in time; and outputting in the output device the joined images,
wherein said video effect recording device comprises a table including a list of said image related information and a video effect associated with said image related information.

22. An image editing method, comprising:

in an image editing apparatus having a recording device which records a plurality of images associated with image related information including at least one of a shooting date and time, a shooting condition, a shooting place, and a user name, a video effect recording device which records a range of image related information associated with a video effect during image switching, a comparison device which compares image related information about a first image with image related information about a second image, a video effect selection device which reads from the video effect recording device a video effect depending on a comparison result, an image joining device which joins a first image with a second image by applying the video effect to the first and second images, and an output device which outputs the joined images:

reading first image related information about a first image recorded in the recording device and second image related information about a second image recorded in the recording device, and comparing the image related information about the first and second images, in the comparison device;

reading in the video effect selection device from the video effect recording device a video effect according to image related information similar in a predetermined range between the image related information about the first and second images as a result of the comparison;

reading the first and second images recorded in the recording device, and automatically joining the images by applying the video effect read by the video effect selection device to a portion in which the images are to be joined in time, in the image joining device; and outputting in the output device the joined images, wherein said video effect recording device comprises a table including a list of said image related information and a video effect associated with said image related information.

\* \* \* \* \*